United States Patent [19]
Tentarelli

[11] Patent Number: 6,086,659
[45] Date of Patent: Jul. 11, 2000

[54] RADIAL FLOW ADSORPTION VESSEL

[75] Inventor: Stephen Clyde Tentarelli, Fogelsville, Pa.

[73] Assignee: Air Products and Chemicals, Inc., Allentown, Pa.

[21] Appl. No.: 09/240,256

[22] Filed: Jan. 29, 1999

[51] Int. Cl.[7] .................................................. B01D 53/04
[52] U.S. Cl. .............................. 96/131; 96/149; 96/151; 422/179; 422/311
[58] Field of Search .............................. 96/108, 130–132, 96/137, 138, 149, 151; 422/170, 179, 220, 311

[56] References Cited

U.S. PATENT DOCUMENTS

| | | | |
|---|---|---|---|
| 4,541,851 | 9/1985 | Bosquain et al. | 55/208 |
| 4,698,072 | 10/1987 | Rohde et al. | 96/131 X |
| 5,133,784 | 7/1992 | Boudet et al. | 95/100 |
| 5,348,573 | 9/1994 | Tomassian et al. | 96/151 |
| 5,350,513 | 9/1994 | Markowitz | 96/151 X |
| 5,425,240 | 6/1995 | Jain et al. | 96/130 X |
| 5,593,475 | 1/1997 | Minh | 96/132 X |
| 5,632,804 | 5/1997 | Schartz | 95/101 |
| 5,716,427 | 2/1998 | Andreani et al. | 96/130 X |
| 5,759,242 | 6/1998 | Smolarek et al. | 96/149 |
| 5,814,129 | 9/1998 | Tentarelli | 96/151 X |
| 5,827,485 | 10/1998 | Libal et al. | 422/179 |

FOREIGN PATENT DOCUMENTS

| | | |
|---|---|---|
| 5715890 | 6/1989 | Australia . |
| 820798A2 | 1/1998 | European Pat. Off. . |
| 3939517 | 6/1991 | Germany . |

OTHER PUBLICATIONS

Kerry, F. G., "Front–Ends for Air Separation Plants–The Cold Facts", *Chemical Engineering Progress*, Aug. 1991, pp. 48–54.

Grenier, M., et al., "Adosrption Purification For Air Separation Units", *Cryogenic Process and Equipment*, book No. G00283, American Society of Mechanical Engineers (1984), pp. 143–148.

von Gemmingen, U., "Designs of Adsorptive Dryers in Air Separation Plants", *Linde AG, Reports on Science and Technology*, (1994), pp. 8–12.

*Primary Examiner*—Robert H. Spitzer
*Attorney, Agent, or Firm*—Willard Jones, II

[57] ABSTRACT

A radial flow adsorption vessel is disclosed together with a method for assembling such a vessel and a method for manufacturing containment screens having bidirectional flexibility for use in such a vessel. The radial flow adsorption vessel includes a substantially cylindrical shell having a longitudinal axis and a plurality of substantially cylindrical screens disposed concentrically inside the shell. Each screen has a different diameter and a longitudinal axis substantially parallel to the longitudinal axis of the shell, and at least one of the screens is flexible in both the axial and radial directions. Preferably, the at least one screen flexible in both the axial and radial directions is an intermediate screen disposed between an outer screen and an inner screen.

30 Claims, 6 Drawing Sheets

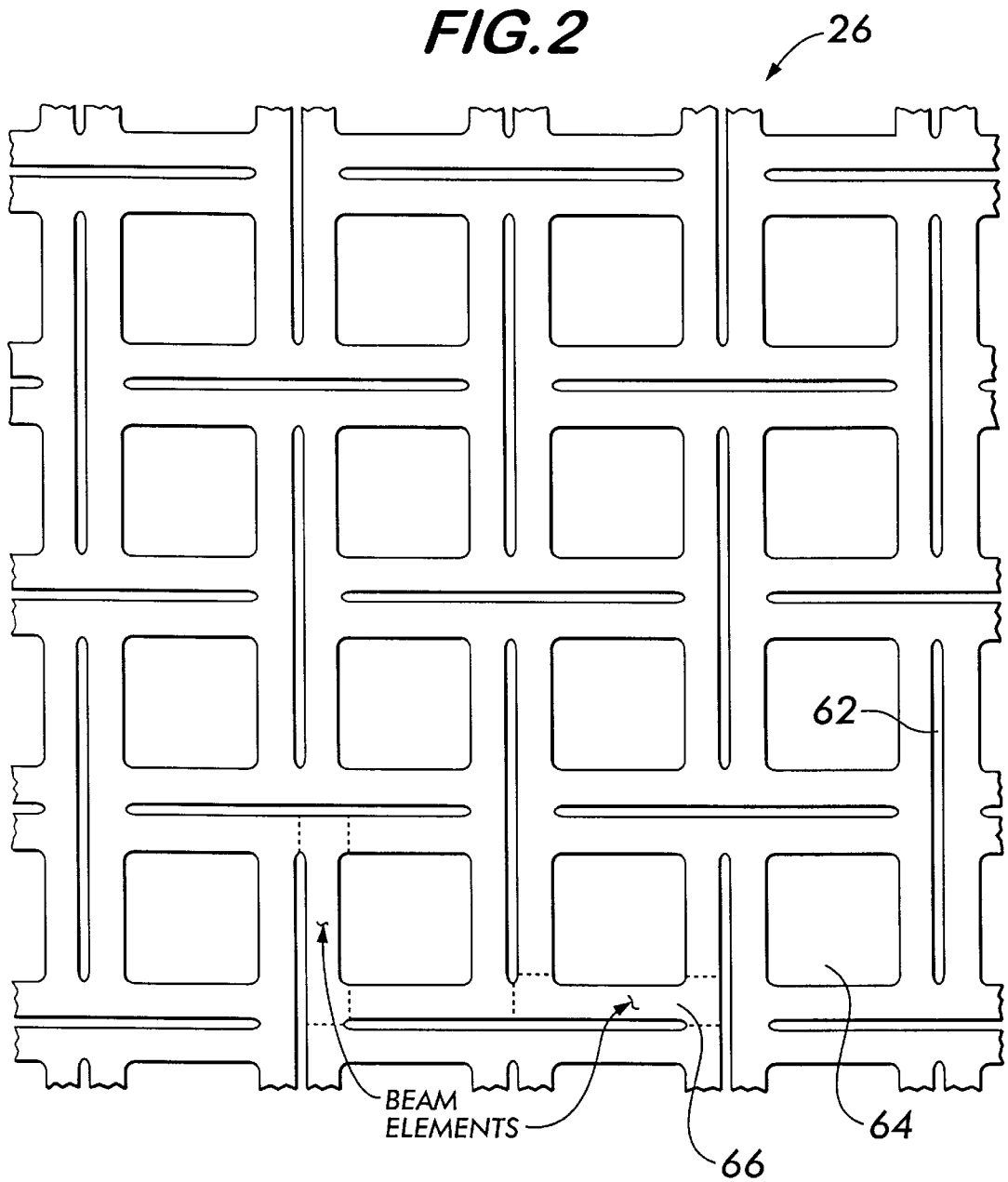

TAPERED BEAM ELEMENTS

CURVED & TAPERED BEAM ELEMENTS

RADIAL FLOW ADSORPTION VESSEL

CROSS-REFERENCE TO RELATED APPLICATIONS

Not Applicable

STATEMENT REGARDING FEDERALLY SPONSORED RESEARCH FOR DEVELOPMENT

Not Applicable

BACKGROUND OF THE INVENTION

The present invention pertains to radial flow adsorption vessels, and in particular to radial flow adsorption vessels having a plurality of concentric permeable screens containing adsorbent particles inside a cylindrical shell.

Radial flow adsorption vessels are used in cryogenic air separation plants as front end purification systems to remove contaminants from the feed air stream prior to the feed air stream entering a cryogenic separation unit.

F. G. Kerry discussed such purification systems in an article titled "Front-Ends for Air Separation Plants-The Cold Facts," Chemical Engineering Progress, August 1991. The use of adsorption vessels in air separation plants is discussed in a paper titled "Adsorption Purification For Air Separation Units" by M. Grenier, J. Y. Lehman, P. Petit and D. V. Eyre, Cryogenic Process and Equipment, book number G00283, American Society of Mechanical Engineers (1984). Another discussion of air separation and the use of radial flow adsorbers is in an article by Dr. Ulrich von Gemmingen titled "Designs of Adsorptive Dryers in Air Separation Plants" Linde AG, Reports on Science and Technology (1994).

A major challenge in the design of radial flow adsorption vessels for use with temperature swing adsorption ("TSA") cycles is to design inexpensive, reliable containment screens that can tolerate the differential thermal expansion and contraction (caused by the cyclic temperature swings) without crushing or abrading the adsorbent particles. The challenge becomes more difficult when the temperature swings are increased and when two or more adsorbent layers are used. i There are four prevalent designs for radial flow adsorption vessels for use with TSA cycles. Each of these designs uses containment screens that are flexible in either the axial or radial direction to accommodate the differential thermal expansion and contraction caused by the large temperature swings of a TSA cycle.

U.S. Pat. No. 4,541,851 discloses a vessel which has two concentric layers of adsorbent and three permeable containment screens. The inner and outer screens are flexible in the axial direction and rigid in the radial direction. The intermediate screen is rigid in the axial direction and flexible in the radial direction. All three screens are interconnected rigidly to the vessel shell at their upper end. The lower ends of the inner and outer screens are interconnected rigidly to the lower end of the intermediate screen. The assembly of the three screens is suspended inside the vessel from the top head so that the weight of the screens and the adsorbent material is supported by the intermediate screen.

As thermal pulses move through the adsorbent bed, the screens alternately are heated and cooled. The intermediate screen expands and contracts in the axial direction and alternately squeezes and releases the adsorbent in the axial direction. The axial movement of the inner and outer screens follows that of the intermediate screen, since the inner and outer screens are flexible in the axial direction. The inner and outer screens expand and contract in the radial direction and alternately squeeze and release the adsorbent bed in the radial direction. The intermediate screen moves radially with the bed since it is flexible in the radial direction, and, as a result, imparts very little additional radial squeezing force on the adsorbent bed.

This arrangement causes the inner and outer screens to experience relatively large thermal strains (and associated thermal stresses), causes relatively large axial movement of the screens (which can result in abrasion between the adsorbent and the screens), produces relatively large axial squeezing forces on the adsorbent, and essentially limits the adsorbent bed to two layers of adsorbent.

A second embodiment disclosed in U.S. Pat. No. 4,541,851 is a vessel which has three concentric layers of adsorbent and four permeable screens. The inner and outer screens are rigid in both the axial and radial directions. The two intermediate screens are flexible in the radial direction and rigid in the axial direction. All four screens are interconnected rigidly to the shell at their lower ends. At their upper ends, all four screens are free to move in the axial direction. The three outer screens are able to slide axially in guides, while the inner most screen terminates in a dome that is able to move freely in the axial direction. This arrangement can accommodate two or more layers of adsorbent.

As thermal pulses move through the adsorbent bed, the screens alternately are heated and cooled. The design allows each of the screens to expand freely and independently of each other in the axial direction. The radial squeezing forces that are produced by differential expansion in the radial direction are transmitted to all three layers of adsorbent owing to the circumferential flexibility of the two intermediate screens.

This arrangement allows relative shearing motion between the screens and the adsorbent when the screens expand and contract in the axial direction. This shearing motion results in abrasion of the screens and attrition of the adsorbent particles. Furthermore, the guides used at the top of the three outer screens require "flexible sealing rings" to prevent the process fluid from passing through the guides. Such flexible sealing rings can be relatively expensive and unreliable.

U.S. Pat. No. 5,827,485 (Australian AU-A-57158/90, European EP-0-402-783-BI) discloses a vessel which has a single layer of adsorbent and two permeable screens, both of which are flexible in the axial direction and rigid in the radial direction. Both screens are interconnected rigidly to the shell of the vessel at their upper and lower ends.

As thermal pulses move through the adsorbent bed, the axial flexibility of the two screens allows their axial thermal expansion and contraction to be constrained by the shell of the vessel. As a result, the only axial movement that occurs is the axial movement due to the thermal expansion and contraction of the shell. Since the shell experiences very little temperature swing, this movement is very small. The radial differential thermal expansion of the screens causes radial squeezing forces on the adsorbent bed. The primary disadvantage of this design is that it is limited to a single layer of adsorbent.

German Patent No. DE-39-39-517-A1 discloses a vessel which has a single layer of adsorbent and two permeable screens, both of which are rigid in the axial and radial directions. The outer side of the inner screen is covered with a layer of permeable compressible material. The screens are interconnected rigidly to each other at their lower end. At their upper ends, the outer screen is interconnected rigidly to the vessel shell and the inner screen is interconnected to the vessel shell with an expansion joint (i.e., bellows) or it is provided with a guide that allows axial sliding. The screen assembly is suspended from the top head of the vessel, with the weight of the adsorbent and the screen assembly supported by the rigid outer screen.

As thermal pulses move through the adsorbent bed, the screens alternately are heated and cooled. The expansion joint or guide at the top of the inner screen accommodates differential axial thermal expansion and contraction between the two screens. The permeable compressible material that covers the inner screen absorbs differential radial thermal expansion and contraction between the screens to avoid large radial squeezing forces on the adsorbent bed.

There are several disadvantages with this design. First, it allows relative shearing motion between the screens and the adsorbent bed when the screens expand and contract in the axial direction. This shearing motion results in attrition of the adsorbent material and abrasion of the screens. (The permeable compressible material that covers the inner screen may be the most vulnerable to abrasion.) Second, it requires an expansion joint or a guide at the top of the inner screen, either one of which can be relatively expensive and unreliable. Third, it might be difficult to find a suitable permeable compressible material, particularly one that can withstand the relatively high temperatures of a TSA cycle. Fourth, the design does not provide for more than one layer of adsorbent.

It is desired to have a radial flow adsorption vessel for use with TSA cycles which uses two or more layers of adsorbent, and which, when compared to prior art designs, can accommodate greater temperature swings, improve the mechanical reliability of the containment screens, and reduce the attrition of the adsorbent material.

It is further desired to have a radial flow adsorption vessel wherein the thermal strain range experienced by the containment screens is significantly less than the strain range experienced by the containment screens in the prior art designs.

It is still further desired to have a radial flow adsorption vessel wherein there is less abrasion between the containment screens and the adsorbent, and lower axial squeezing forces on the adsorbent, which will result in less attrition of the adsorbent.

It is still further desired to have a radial flow adsorption vessel which can withstand the temperature swings of a TSA cycle better than the prior art vessels.

It is still further desired to have a radial flow adsorption vessel wherein there is relatively little shearing movement between the adsorbent and the containment screens.

It also is further desired to have an improved cryogenic air separation plant having an improved radial flow adsorption vessel which overcomes many of the difficulties and disadvantages of the prior art to provide better and more advantageous results.

BRIEF SUMMARY OF THE INVENTION

The present invention is a radial flow adsorption vessel ("vessel"). The invention also includes methods for assembling the vessel, methods for manufacturing containment screens having bidirectional flexibility for use in the vessel, and the screens having bidirectional flexibility for use in processes having sudden temperature changes.

The radial flow adsorption vessel comprises a substantially cylindrical shell having a longitudinal axis and a plurality of substantially cylindrical screens (containment screens) disposed concentrically inside the shell. Each screen has a different diameter and a longitudinal axis substantially parallel to the longitudinal axis of the shell, and at least one of the screens is flexible in both the axial and radial directions. In the preferred embodiment, the at least one screen flexible in both the axial and radial directions is an intermediate screen disposed between an outer screen and an inner screen.

The bidirectional flexibility of the at least one screen may be provided in several ways. One way is to include a plurality of apertures in the at least one screen.

In one embodiment, the apertures are arranged in a pattern whereby horizontally and vertically oriented beam elements are formed in the at least one screen. Various patterns may be used, including but not limited to the following: a pattern wherein the beam elements are generally straight; a pattern wherein the beam elements are generally tapered; and a pattern wherein the beam elements are generally curved and tapered. Another possibility is to have the beam elements arranged in a herringbone pattern.

In the most preferred embodiment, the vessel has a plurality of particles of adsorbent disposed in the annular spaces between adjacent containment screens. A fine mesh material adapted to prevent the particles of adsorbent from passing through apertures in the screens also may be included.

In a principal configuration of the invention, the radial flow adsorption vessel includes: a substantially cylindrical shell having a longitudinal axis, a first diameter, a first end, and a second end opposite the first end; a bottom plate disposed inside the shell adjacent the second end of the shell and connected rigidly to the shell; a substantially cylindrical outer screen disposed inside the shell; a substantially cylindrical inner screen disposed inside the outer screen; and at least one substantially cylindrical intermediate screen disposed between the inner screen and the outer screen. The outer screen has a longitudinal axis substantially parallel to the longitudinal axis of the shell, a second diameter less than the first diameter of the shell, an upper end, and a lower end opposite the upper end. The outer screen is flexible in the axial direction and rigid in the radial direction. The upper end of the outer screen is connected rigidly to the first end of the shell and the lower end of the outer screen is connected rigidly to the bottom plate. The inner screen has a longitudinal axis substantially parallel to the longitudinal axis of the shell, a third diameter less than the second diameter of the outer screen, an upper end, and a lower end opposite the upper end. The inner screen is flexible in the axial direction and rigid in the radial direction. The upper end of the inner screen is connected rigidly to the lower end of the shell and the lower end of the screen is connected rigidly to the bottom plate. Each intermediate screen has a longitudinal axis substantially parallel to the longitudinal axis of the shell, and a diameter greater than the third diameter of the inner screen, an upper end, and a lower end. Each intermediate screen is flexible both in the axial and radial directions. The upper end of each intermediate screen is connected rigidly to the first end of the shell and the lower end of each intermediate screen is connected rigidly to the bottom plate.

The invention includes several variations of the principal configuration. The first variation includes a substantially cylindrical shell having a longitudinal axis, a first diameter, a first end, and a second end opposite the first end; a movable bottom plate disposed inside the shell, the bottom plate having a lower surface facing the second end of the shell; a support disposed inside the shell adjacent the second end of the shell and connected rigidly to the shell, the support adapted to supportingly limit axial movement of the movable bottom plate toward the second end of the shell but allow axial movement toward the first end of the shell; a substantially cylindrical outer screen disposed inside the shell; a substantially cylindrical inner screen disposed inside the outer screen; and at least one substantially cylindrical intermediate screen disposed between the inner screen and the outer screen. The outer screen has a longitudinal axis substantially parallel to the longitudinal axis of the shell, a second diameter less than the first diameter of the shell, an upper end and a lower end opposite the upper end. The outer screen is flexible in an axial direction and rigid in a radial direction. The upper end of the outer screen is connected rigidly to the first end of the shell and the lower end of the outer screen is connected rigidly to the bottom plate. The inner screen has a longitudinal axis substantially parallel to the longitudinal axis of the shell, a third diameter less than the second diameter of the outer screen, an upper end, and a lower end opposite the upper end. The inner screen is flexible in the axial direction and rigid in the radial direction. The upper end of the inner screen is connected rigidly to the first end of the shell and the lower end of the inner screen is connected rigidly to the bottom plate. Each intermediate screen has a longitudinal axis substantially parallel to the longitudinal axis of the shell, a diameter greater than the third diameter of the inner screen, an upper end, and a lower end. Each intermediate screen is flexible both in the axial and radial directions. The upper end of each intermediate screen is connected rigidly to the first end of the shell and the lower end of each intermediate screen is connected rigidly to the bottom plate.

Another embodiment of the first variation is similar to the previously described embodiment of the first variation except that there are certain differences in the bottom plate and the support. In this alternate embodiment, the movable plate disposed inside the shell has a lower surface facing the second end of the shell. The support disposed inside the shell adjacent the second end of the shell and connected rigidly to the shell is adapted to supportingly limit the axial movement of the bottom plate toward either end of the shell.

A second variation includes a substantially cylindrical shell having a longitudinal axis, a first diameter, a first end, and a second end opposite the first end; a substantially cylindrical outer screen disposed inside the shell; a substantially cylindrical inner screen disposed inside the outer screen; and at least one substantially cylindrical intermediate screen disposed between the inner screen and the outer screen. The outer screen has a longitudinal axis substantially parallel to the longitudinal axis of the shell, a second diameter less than the first diameter of the shell, an upper end, and a lower end opposite the upper end. The outer screen is rigid in an axial direction and rigid in a radial direction. The upper end of the screen is connected rigidly to the first end of the shell and the lower end of the outer screen is connected rigidly to a bottom plate disposed inside the shell adjacent the second end of the shell. The inner screen has a longitudinal axis substantially parallel to the longitudinal axis of the shell, a third diameter less than the second diameter of the outer screen, an upper end, and a lower end opposite the upper end. The inner screen is flexible in an axial direction and rigid in the radial direction. The upper end of the inner screen is connected rigidly to the first end of the shell and the lower end of the inner screen is connected rigidly to the bottom plate. Each intermediate screen has a longitudinal axis substantially parallel to the longitudinal axis of the shell, a diameter greater than the third diameter of the inner screen, an upper end, and a lower end. Each intermediate screen is flexible both in the axial and radial directions. The upper end of each intermediate screen is connected rigidly to the first end of the shell and the lower end of each intermediate screen is connected rigidly to the bottom plate.

A third variation includes a substantially cylindrical shell having a longitudinal axis, a first diameter, a first end, and a second end opposite the first end; a substantially cylindrical outer screen disposed inside the shell; a substantially cylindrical inner screen disposed inside the outer screen; and at least one substantially cylindrical intermediate screen disposed between the inner screen and the outer screen. The outer screen has a longitudinal axis substantially parallel to the longitudinal axis of the shell, a second diameter less than the first diameter of the shell, an upper end, and a lower end opposite the upper end. The outer screen is flexible in an axial direction and rigid in a radial direction. The upper end of the outer screen is connected rigidly to the first end of the shell and the lower end of the outer screen is connected rigidly to a bottom plate disposed inside the shell adjacent the second end of the shell. The inner screen has a longitudinal axis substantially parallel to the longitudinal axis of the shell, a third diameter less than the second diameter of the outer screen, an upper end, and a lower end opposite the upper end. The inner screen is rigid in the axial direction and rigid in the radial direction. The upper end of the inner screen is connected rigidly to the first end of the shell and the lower end of the inner screen is connected rigidly to the bottom plate. Each intermediate screen has a longitudinal axis substantially parallel to the longitudinal axis of the shell, a diameter greater than the third diameter of the inner screen, an upper end, and a lower end. Each intermediate screen is flexible both in the axial and radial directions. The upper end of each intermediate screen is connected rigidly to the first end of the shell and the lower end of each intermediate screen is connected rigidly to the bottom plate.

The fourth variation includes a substantially cylindrical shell having a longitudinal axis, a first diameter, a first end, and a second end opposite the first end; a substantially cylindrical outer screen disposed inside the shell; a substantially cylindrical inner screen disposed inside the outer screen; and a plurality of substantially cylindrical intermediate screens disposed between the inner screen and the outer screen. The outer screen has a longitudinal axis substantially parallel to the longitudinal axis of the shell, a second diameter less than the first diameter of the shell, an upper end, and a lower end opposite the upper end. The outer screen is flexible in an axial direction and rigid in a radial direction. The upper end of the outer screen is connected rigidly to the first end of the shell and the lower end of the outer screen is connected rigidly to a bottom plate disposed inside the shell adjacent the second end of the shell. The inner screen has a longitudinal axis substantially parallel to the longitudinal axis of the shell, a third diameter less than the second diameter of the outer screen, an upper end, and a lower end opposite the upper end. The inner screen is flexible in the axial direction and rigid in the radial direction. The upper end of the inner screen is connected rigidly to the first end of the shell and the lower end of the inner screen is connected rigidly to the bottom plate. Each intermediate screen has a longitudinal axis substantially parallel to the longitudinal axis of the shell, a diameter greater than the third diameter of the inner screen, an upper end, and a lower end. One intermediate screen is flexible in the radial direction and rigid in the axial direction, and at least one intermediate screen is flexible both in the axial and radial directions. The upper end of each intermediate screen is connected rigidly to the first end of the shell and the lower end of each intermediate screen is connected rigidly to the bottom plate.

Another aspect of the present invention is a cryogenic air separation plant having a radial flow adsorption vessel such as any one of the vessels discussed above, including but not limited to the various configurations and variations. One such cryogenic air separation plant has a radial flow adsorption vessel comprising a substantially cylindrical shell having a longitudinal axis and a plurality of substantially cylindrical screens disposed concentrically inside the shell. Each screen has a different diameter and a longitudinal axis substantially parallel to the longitudinal axis of the shell, and at least one of the screens is flexible in both the axial and radial directions.

The invention also includes methods for assembling a radial flow adsorption vessel. One method includes three steps. The first step is to provide a substantially cylindrical shell having a longitudinal axis. The second step is to provide a plurality of substantially cylindrical screens, each screen having a different diameter and a longitudinal axis substantially parallel to the longitudinal axis of the shell, wherein at least one of the screens is flexible in both the axial and radial directions. The third step is to install the screens concentrically inside the shell.

Another method is like the previous method, but includes one additional step. The additional step is to provide a plurality of particles of adsorbent in an annular space between at least two adjacent screens.

The invention also includes methods for manufacturing a containment screen having bidirectional flexibility for use in a radial flow adsorption vessel. One method includes two steps. The first step is to provide a substantially rectangular sheet. The second step is to form a pattern of apertures in the sheet, whereby an assemblage of beams in bending is formed in the sheet making the sheet flexible in two perpendicular directions in a plane of the sheet.

In one embodiment of the method for manufacturing, the beams are generally straight. In a second embodiment, the beams are generally tapered. In a third embodiment, the beams are generally curved and tapered. In a fourth embodiment, the beams are arranged in a herringbone pattern.

Another method for manufacturing includes one additional step. The additional step is to form a cylinder from the sheet having the pattern of apertures. The invention also includes screens having bidirectional flexibility for use in processes having sudden temperature changes. The screen comprises a sheet having a pattern of apertures in the sheet, wherein an assemblage of beams in bending is formed in the sheet making the sheet flexible in two perpendicular directions in a plane of the sheet. In one embodiment, the beams are generally straight. In a second embodiment, the beams are generally tapered. In a third embodiment, the beams are generally curved and tapered. In a fourth embodiment, the beams are arranged in a herringbone pattern.

BRIEF DESCRIPTION OF THE DRAWINGS

Embodiments of the invention will now be described by way of example with reference to the accompanying drawings, in which:

FIG. 2 is a fragmentary view of a portion of a screen having one pattern of apertures which form horizontally and vertically oriented beam elements that are generally straight;

DETAILED DESCRIPTION OF THE INVENTION

Figure 1:
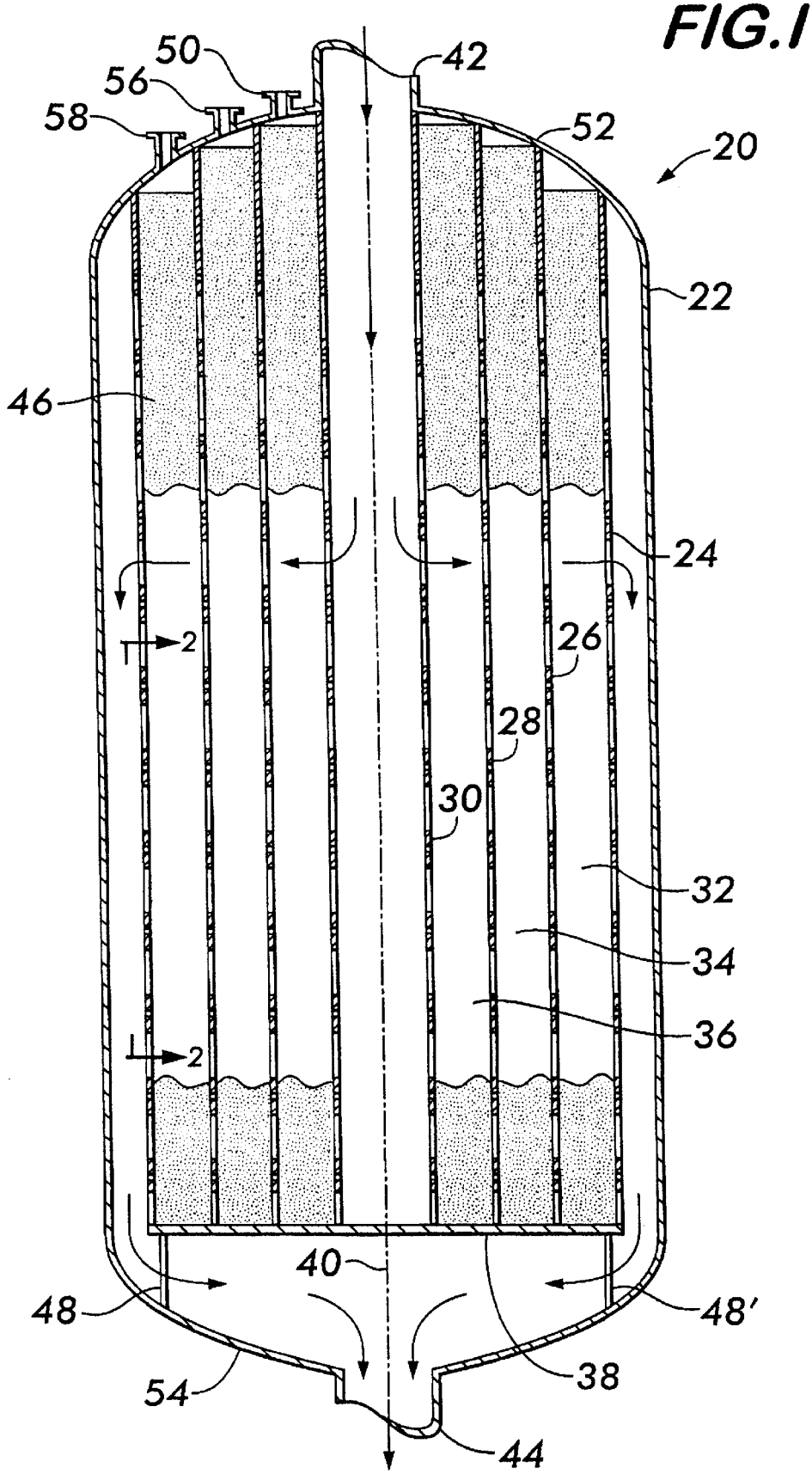
FIG. 1 is a longitudinal cross-sectional view of the radial flow adsorption vessel according to one embodiment of the invention.

Referring to the drawings, the principal configuration of the radial flow adsorption vessel ("vessel") 20 is shown in FIG. 1. The vessel comprises a cylindrical shell 22 with three or more concentric permeable cylinders (i.e., containment screens) located inside the shell. The annular spaces between the containment screens ("screens") are filled with adsorbent 46. The particular embodiment shown in FIG. 1 has four concentric screens (24, 26, 28, 30) and accommodates three layers of adsorbent in three annular spaces (32, 34, 36). The screens are designated as the inner screen 30, the intermediate screens (26, 28), and the outer screen 24. All four of the cylindrical concentrically arranged screens and the shell have the same axis of symmetry or longitudinal axis 40 in the embodiment shown in FIG. 1.

In addition to the cylindrical shell 22, the vessel 20 has a first or top end 52 enclosed by a generally hemispherical head and a second or bottom end 54 which also is enclosed by a generally hemispherical head. First end 52 has an inlet conduit or nozzle 42, and second end 54 has an outlet conduit or nozzle 44. The head of first end 52 also includes fill-ports (50, 56, 58) for introducing and removing adsorbent 46 from the interior of the vessel.

Each layer of adsorbent 46 in the annular spaces (32, 34, 36) may be different than an adjacent layer. For example, adjacent layers may comprise the same material, but the sizes and/or shapes of the particles of the material may differ in adjacent layers. In addition to such variations, different types of materials, such as alumina, molecular sieve, and zeolites, may be used in the various layers. Persons skilled in the art will recognize that other types of materials may be used for different applications.

To accommodate the large temperature swings that occur with a typical temperature swing adsorption ("TSA") cycle, the following configuration is used:
1. the inner screen 30 and outer screen 24 are flexible in the axial direction and rigid in the radial direction;
2. the intermediate screens (26, 28) are flexible in BOTH the axial and radial directions;
3. all of the screens (24, 26, 28, 30) are interconnected rigidly to the top of the shell 22 at the upper ends of the screens; and
4. all of the screens are interconnected rigidly to each other and to the shell at the lower ends of the screens by a bottom plate 38, which is connected rigidly to the shell by members 48, 48'.

As used herein, the term "rigid" is intended to mean that the possible elastic deformation of a screen in the considered direction is due primarily to the elasticity inherent in the screen material (usually metal) itself.

As used herein, the term "flexible" is intended to mean that the screen is capable of elastic deformations in the considered direction that are much larger than could be accommodated by the inherent elasticity of the screen material itself. Furthermore, the force that is required to deform the screen in the considered direction is much lower than the force that would be required to deform the screen material itself.

Persons skilled in the art will recognize that members 48, 48' may take the form of structures other than that shown in FIG. 1. The members must, however, allow for the flow of gas (process fluid) through or around the members. For example, permeable members could be made of metal plates having holes or other apertures in the plates.

As indicated in FIG. 1, a portion of each of the screens (24, 26, 28, 30) near the upper end of the screen is not permeable (i.e., non permeable). These non permeable portions of the screens are sealed and connected rigidly to the top of the shell 22.

During a typical TSA cycle, the temperature of the gas flowing through a radial flow adsorbent vessel ("vessel") is changed repeatedly and abruptly by several hundred degrees (F). These sudden changes in temperature produce thermal pulses in the adsorbent beds which cause large temperature gradients or differences between the various screens and the adsorbent.

For example, referring to FIG. 1, in which the arrows indicate flow of a gas (process fluid), a typical scenario is as follows:

The gas flowing through the vessel 20 enters through the top nozzle 42, flows radially outward through the layers of adsorbent 46 and exits the vessel at the bottom nozzle 44.

Initially, the screens (24, 26, 28, 30) and the adsorbent are at a relatively uniform temperature equal to the temperature of the gas flowing through the vessel.

Suddenly, the temperature of the gas increases by several hundred degrees (F).

Shortly thereafter, the inner screen 30 and a small portion of the adsorbent 46 adjacent to the inner screen will become hot relative to the other screens (24, 26, 28) and to the remaining portion of the adsorbent. As time progresses, a hot temperature pulse will move radially outward through the layers of adsorbent 46, sequentially heating the remainder of the first adsorbent layer, followed by the first intermediate screen 28, the second adsorbent layer, the second intermediate screen 26, the third layer of adsorbent, and finally, the outer screen 24. At this point, all of the screens (24, 26, 28, 30) and the adsorbent 46 will be at a relatively uniform hot temperature and the temperature of the gas suddenly will be decreased by several hundred degrees (F). When this happens, a cold temperature pulse will move radially outward through the layers of adsorbent sequentially cooling the screens and adsorbent layers in the same manner as the hot temperature pulse. This heating and cooling cycle may occur up to 50,000 times during the life of a radial flow adsorption vessel in a TSA cycle.

The shell 22 also experiences temperature swings. However, in contrast to the temperature swings in the screens (24, 26, 28, 30), the temperature swings in the shell usually are very small due to the relatively large thermal mass of the shell, the low rate of heat transfer between the gas and the shell, and controls on the cycle which limit the duration of time that the shell is exposed to hot gas. Calculations suggest that the shell will experience temperature swings that are less than 10% of the temperature swing experienced by the screens and the adsorbent.

The axial movement of the bottom plate 38 is restrained to the axial movement of the shell 22 and the members 48, 48'. Radial differential thermal expansion between the bottom plate 38, the members 48, 48', and the second end 54 of shell 22 is accommodated by flexibility in the members 48, 48'.

It is obvious that large temperature differences will exist between the various components of the vessel as the temperature pulses move through the layers of adsorbent. If the vessel is not designed properly, differential thermal expansion and contraction of the various components could destroy the screens and/or crush the adsorbent material. The present invention uses flexible screens to accommodate differential thermal expansion and contraction.

In the axial direction, as the screens alternately are heated and cooled, there is no relative movement between the screens, and, axial expansion and contraction of the screens are constrained to the axial expansion and contraction of the shell. Since the shell experiences very little temperature swing, the axial movement of the screens is very small. Two advantages of reducing the axial movement of the screens are a reduction in the amount of abrasion that occurs between the screens and the adsorbent material, and a reduction in the axial squeezing force that is exerted on the layers of adsorbent by the screens. The axial flexibility of the screens allows their axial movement to be constrained by the shell. Without axial flexibility, the screens would need some type of sliding joint to accommodate their axial expansion and contraction, or, if the axial movement was constrained, the screens would experience very high thermally induced mechanical stresses. The differential axial thermal expansion and contraction of the adsorbent material is accommodated by the inherent compliance of the adsorbent material.

In the radial direction, as the screens alternately are heated and cooled, the inner and outer screens expand and contract in the radial direction (because they are rigid in the radial direction), and alternately squeeze and release the layers of adsorbent in the radial direction. The largest squeezing force occurs when the inner screen is hot, the outer screen is cold, and the adsorbent is hot. The smallest squeezing force (i.e., the bed is released) occurs when the inner screen is cold, the outer screen is hot, and the adsorbent is cold. The compliance of the adsorbent material accommodates the radial squeezing forces exerted by the screens and the differential thermal expansion and contraction of the adsorbent itself. The intermediate screens, being flexible in the radial direction, move with the layers of adsorbent in the radial direction and, as a result, these screens impart very little additional radial squeezing force on the adsorbent. If the intermediate screens were rigid in the radial direction the screens would impart significant additional radial squeezing forces on the adsorbent and, potentially, could crush the adsorbent.

Figure 3:
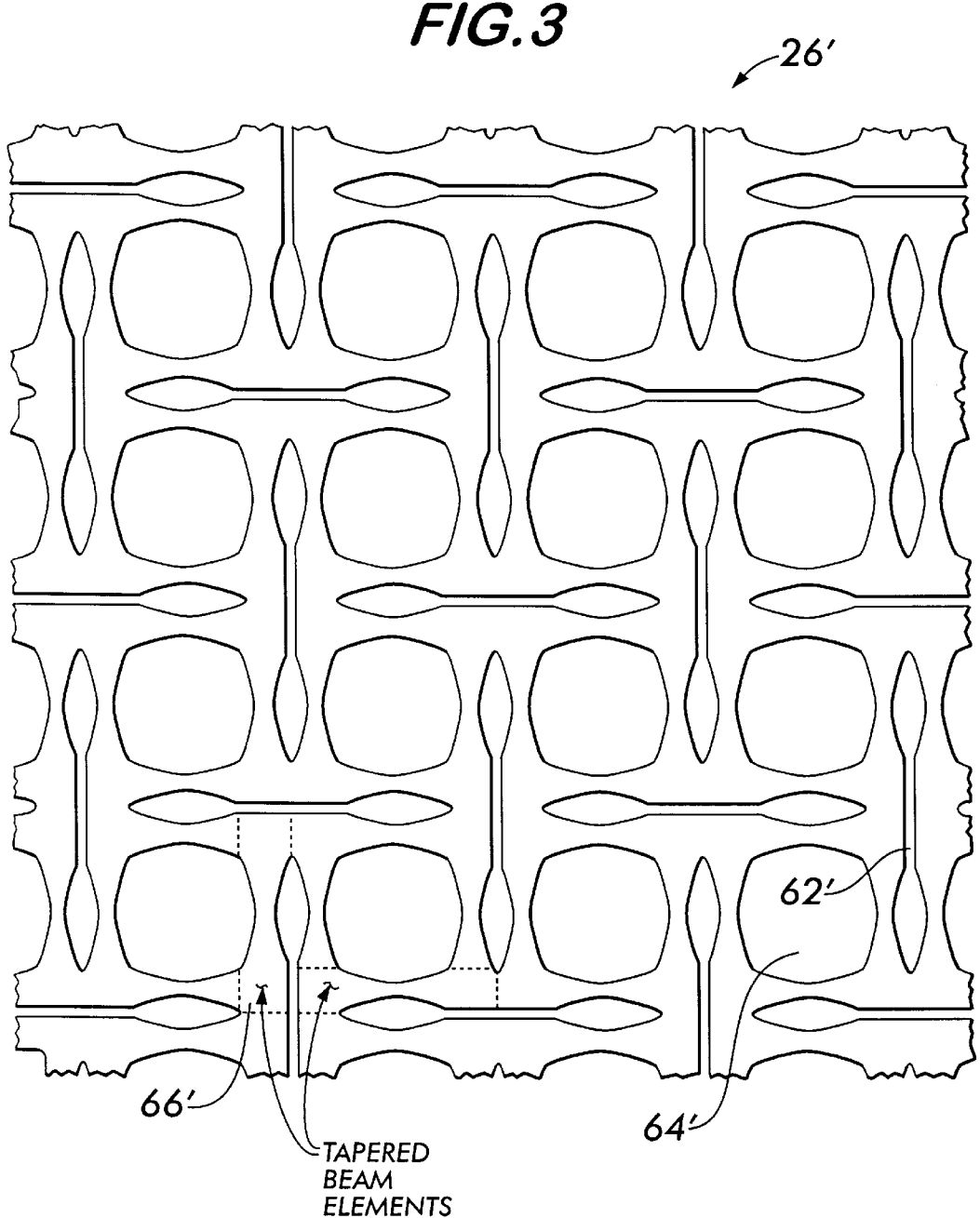
FIG. 3 is a fragmentary view of a portion of a screen having another pattern of apertures which form beam elements that are generally tapered.

As indicated, the inner screen 30 and the outer screen 24 in the principal configuration shown in FIG. 1 have unidirectional flexibility (i.e., flexibility in the axial direction). Various designs for containment screens with unidirectional flexibility are described in the prior art. These designs include:

A cylinder with a staggered slot pattern (FIGS. 2 and 3 of U.S. Pat. No. 4,541,851, and FIGS. 3 and 4 of U.S. Pat. No. 5,827,485)

Figure 5:
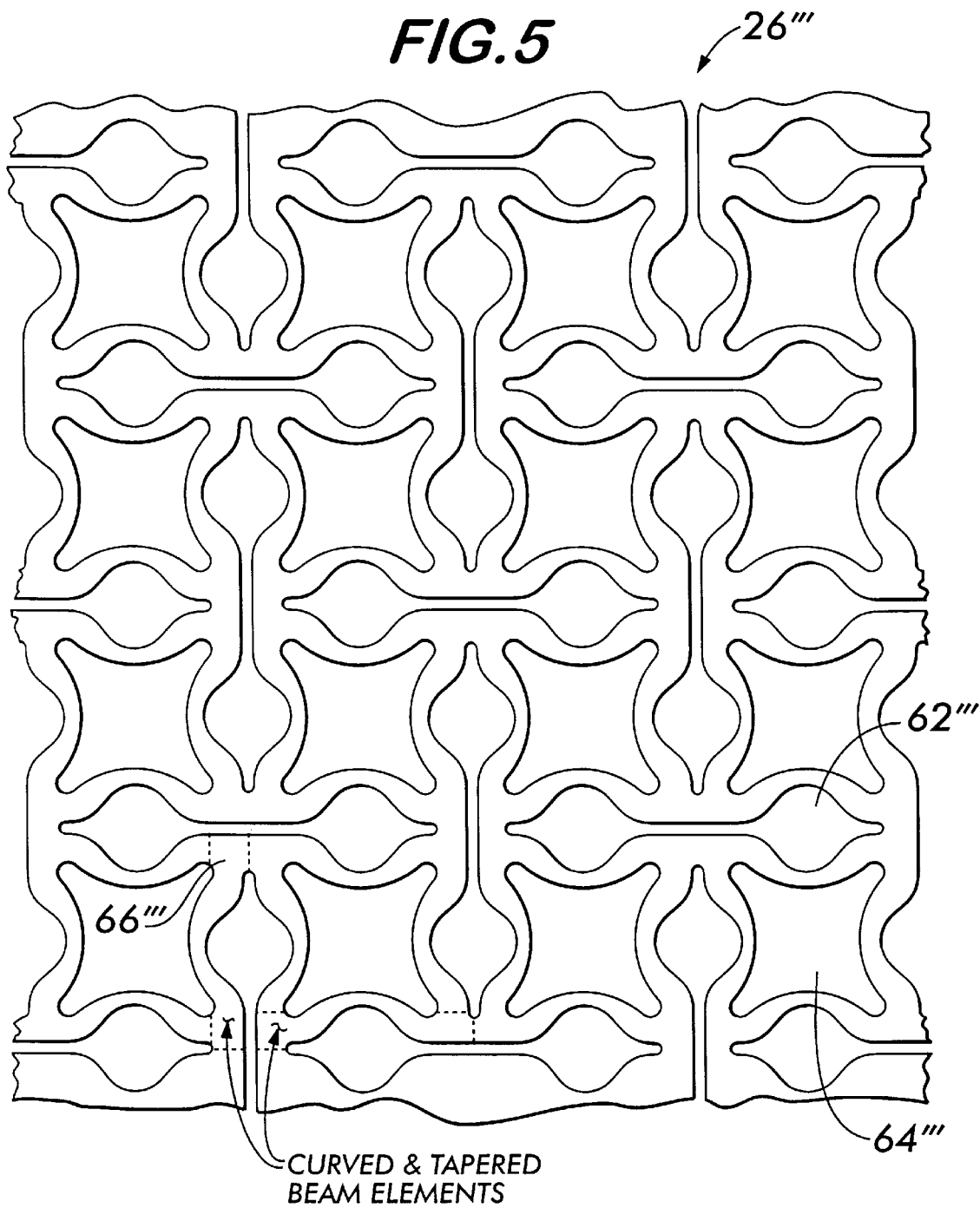
FIG. 5 is a fragmentary view of a portion of a screen having another pattern of apertures which form beam elements that are generally curved and tapered.

Perforated corrugated sheets (FIG. 5 of U.S. Pat. No. 4,541,851)

A cylindrical framework of honeycomb construction (FIG. 6 of U.S. Pat. No. 4,541,851)

Folded/expandable seams (FIG. 7 of U.S. Pat. No. 4,541,851)

A wire web (FIGS. 6 and 7 of U.S. Pat. No. 5,827,485)

A rigid cylinder covered with a layer of permeable compressible material to effectively provide radial flexibility (German Patent No. DE-39-39-517-A1)

With the exception of the last design, any of these designs would provide the axial flexibility required by the inner and outer screens in the present invention. Due to ease of fabrication, the preferred design is the cylinder with a staggered slot pattern. With this design the inner and outer screens can be made from metal sheets or plates that have a series of staggered slots cut into them. The slotted sheets can be formed into cylinders with the slots oriented so that the long dimension of the slots runs around the circumference of the cylinder. If the adsorbent particles are small enough to fall through the slots, the slotted cylinder can be covered with a fine mesh, such as woven wire cloth or expanded metal, to prevent the particles from falling through the slots.

The intermediate screens (26, 28) of the present invention must be flexible in two directions (i.e., bidirectional), both axially and radially. Two methods may be used to accomplish this. The first method combines two of the prior art screens which provide unidirectional flexibility (discussed above for the inner and outer screens). The second method involves cutting a special pattern of holes into a metal sheet so that the sheet behaves as an assemblage of "beams in bending". These "beams" are configured so that the sheet is flexible in two perpendicular directions in a plane of the sheet. Examples of bidirectional screens using the first method include:

The staggered slot design combined with the corrugated sheet design. The screen would be made from a sheet that is both slotted and corrugated. The long dimension of the staggered slots would be perpendicular to the corrugation rows so that the staggered slots would provide flexibility in one direction, while the corrugations would provide flexibility in the other direction.

The staggered slot design combined with the folded/expandable seam design. The long dimension of the staggered slots would be perpendicular to the seams so that the staggered slots would provide flexibility in one direction and the seams would provide flexibility in the other direction.

The corrugated sheet design combined with the folded/expandable seam design. The corrugation rows would be perpendicular to the seams so that the corrugations would provide flexibility in one direction and the seams would provide flexibility in the other direction.

The staggered slot design combined with the layer of permeable compressible material design. A cylinder would be made with staggered slots to provide axial flexibility, and then covered with a permeable compressible material to provide radial flexibility.

As indicated, the second method for providing the bidirectional flexibility of the intermediate screens involves making the screens from metal sheets or plates that have a special pattern of holes or apertures. The hole pattern is designed so that the plate behaves as an assemblage of small beams which can bend in a plane of the plate. The beams are configured so that the metal sheet is flexible in two perpendicular directions in a plane of the sheet.

Several hole patterns are shown in FIGS. 2 through 5. Screens having these patterns may be used not only in radial flow adsorption vessels, but also in other applications (e.g., in other types of equipment used in processes having sudden temperature changes and/or large temperature gradients).

FIG. 2 shows a pattern of slots 62 and rectangularly shaped holes 64 which form horizontally and vertically oriented beam elements 66. Bending of the horizontal beam elements provides vertical flexibility, while bending of the vertical beam elements provides horizontal flexibility. The size and aspect ratio of the holes, slots, and beam elements can be designed to provide a desired balance of strength and flexibility in the horizontal and vertical directions. For example, making the beam elements longer and more slender will make the plate more flexible. However, if the plate is too flexible it will be unwieldy during fabrication and unable to maintain its cylindrical shape.

The pattern shown in FIG. 3 for screen 26' with slots 62' and holes 64' is similar to the pattern in FIG. 2, except that the beam elements 66' are tapered rather then straight. Tapering the beam elements provides the designer with greater control over the trade-offs between strength and flexibility.

Figure 4:
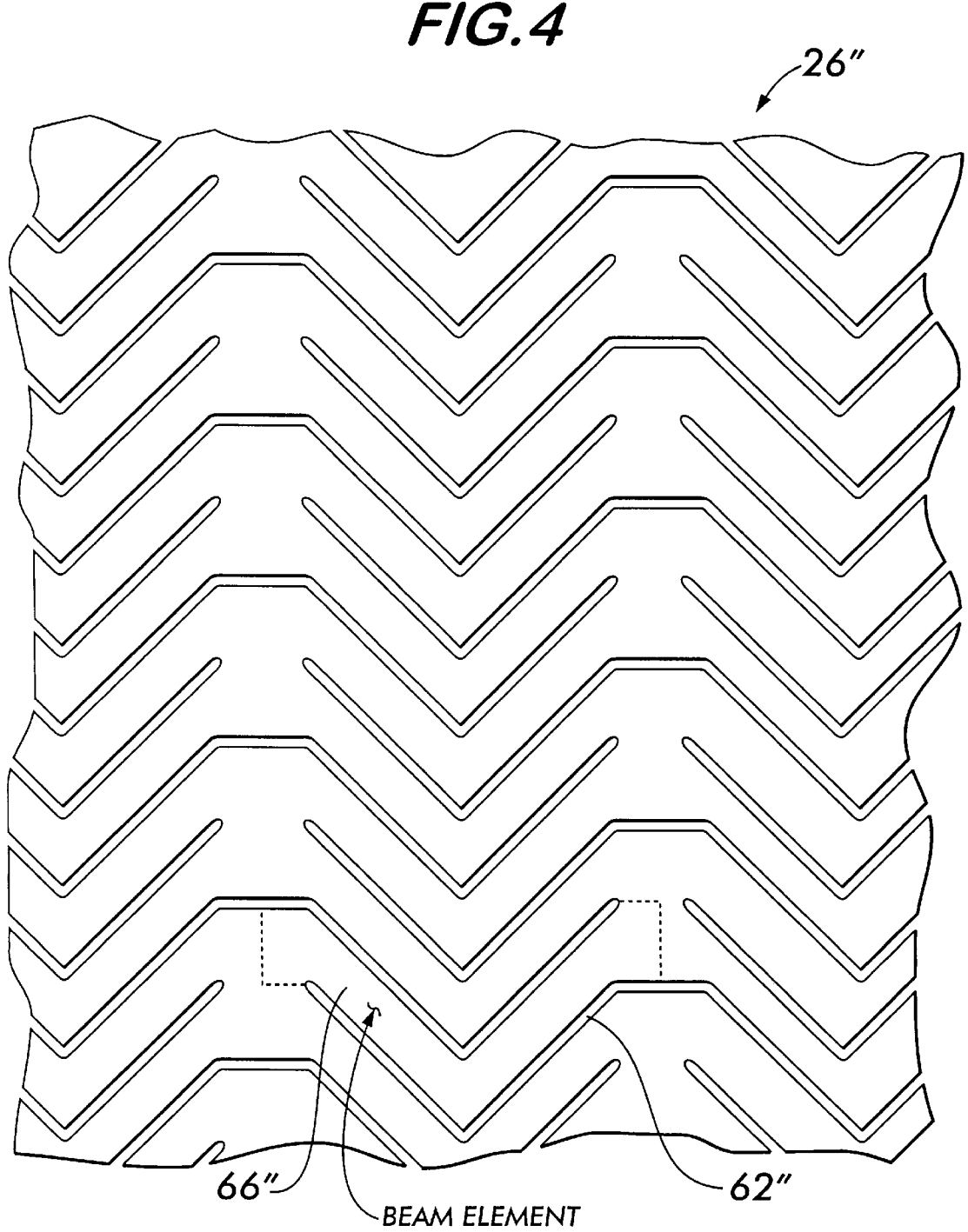
FIG. 4 is a fragmentary view of a portion of a screen having another pattern of apertures forming beam elements which are arranged in a herringbone pattern.

The pattern shown in FIG. 4 for screen 26" with slots 62" resembles a herringbone pattern. With this pattern, the beam elements 66" bend to provide flexibility in the y-direction (vertical) and straighten to provide flexibility in the x-direction (horizontal). The size and aspect ratio of the beam elements can be adjusted to provide the desired balance of strength and flexibility. Generally, this pattern produces much more flexibility in the x-direction (horizontal) than in the y-direction (vertical). Once again, tapering the beam elements will provide some additional control over the trade-offs between strength and flexibility.

The pattern shown in FIG. 5 for screen 26''' with slots 62''' and holes 64''' is a combination of the patterns shown in FIGS. 3 and 4. It has both vertically and horizontally oriented tapered beam elements 66''', as does the design in FIG. 3. In addition, similar to the herringbone pattern in FIG. 4, the beam elements 66''' are curved so that they can provide flexibility by both bending and straightening. The size and aspect ratios of the beams, the curvature, and the amount of taper can be de signed to provide the desired balance of strength and flexibility.

Any of the methods that provide bidirectional flexibility are suitable for intermediate screens. The screens can be fabricated by forming cylinders from metal sheets or plates that are flexible in two directions. If the adsorbent particles are small enough to fall through the openings in the cylinders, the cylinders can be covered with a fine mesh, such as woven wire cloth or expanded metal, to prevent the particles from falling through the openings.

The use of a screen (or screens) which is flexible in two directions provides several variations to the principal configuration illustrated in FIG. 1.

Figure 1A:
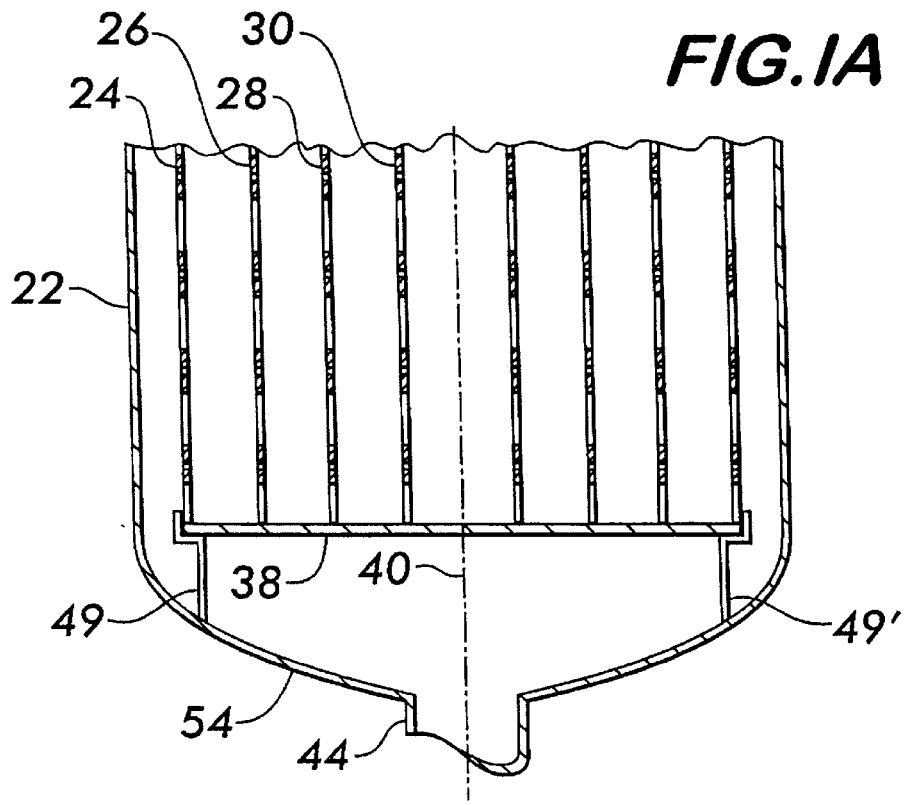
FIG. 1A is a cross-sectional view of a portion of the radial flow adsorption vessel according to another embodiment of the invention.

The first variation involves a slight modification to the principal configuration. It comprises a cylindrical shell 22 with three or more concentric permeable cylinders (i.e., screens) inside the shell. The annular spaces between the permeable screens are filled with adsorbent 46. Similar to the principal configuration, the inner screen 30 and the outer screen 24 are flexible in the axial direction and rigid in the radial direction, and the intermediate screen(s) is flexible in both the axial and radial directions. All of the screens are interconnected rigidly to the shell at the upper ends of the screens. At the lower ends, the screens are interconnected rigidly to each other by a bottom plate 38. However, unlike the principal configuration shown in FIG. 1, the bottom plate is not interconnected rigidly to the shell. Instead, as illustrated in FIG. 1A, the bottom plate 38 rests on a support 49/49' which is interconnected rigidly to the lower end of the shell 22. This variation operates the same as the principal configuration with the exception that the bottom plate 38 can lift-off of the support 49 (particularly when and if the shell is hotter than the screens and the adsorbent material).

In the embodiment shown in FIG. 1A, support member 49 prevents downward vertical movement of the bottom plate 38, but allows upward vertical movement. Member 49 allows a small amount of radial movement in the bottom plate 38 to accommodate radial differential thermal expansion between bottom plate 38 and member 49 and the second end 54 of shell 22. (Elimination of the uppermost vertical portion of member 49 would allow a greater amount of radial movement.) Member 49 is permeable.

Figure 1B:
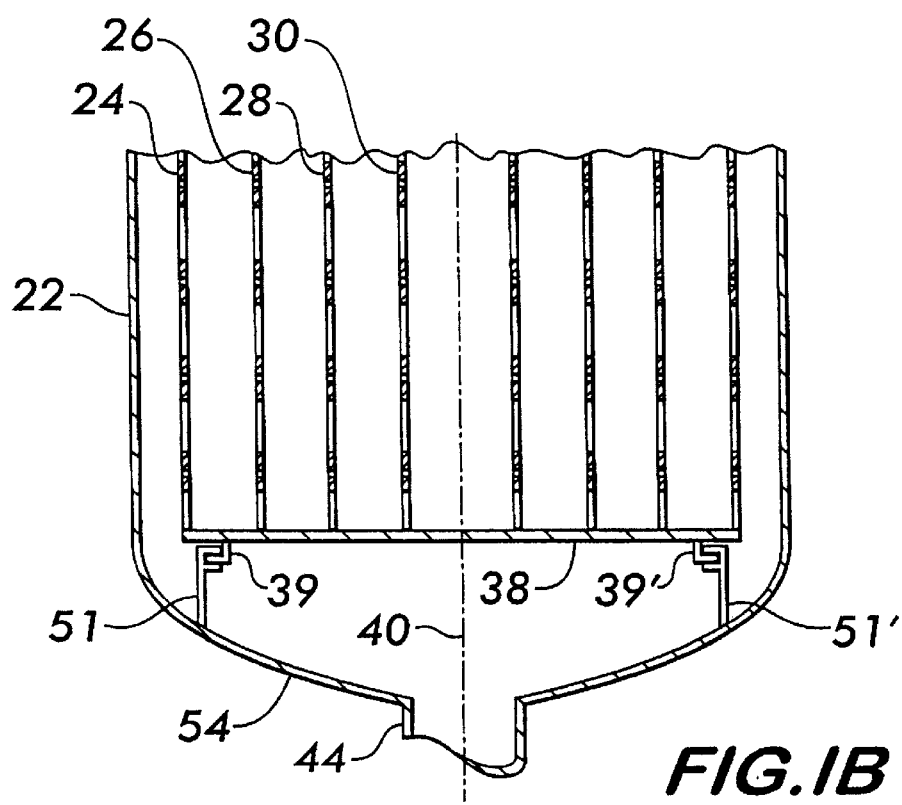
FIG. 1B is a cross-sectional view of a portion of the radial flow adsorption vessel according to another embodiment of the invention.

Another embodiment of the first variation uses a different support member 51 illustrated in FIG. 1B. The support member 51 is connected rigidly to the second end 54 of shell 22. A first connecting device 39/39' is connected rigidly to the bottom plate 38. The first connecting device 39 fits into a second connecting device at the top end of the support member 51/51' so that the bottom plate 38 is restrained from moving in the axial direction relative to the axial movement of the support member 51 and the second end 54 of shell 22. The connection between the first connecting device 39 and the support member 51 allows for a small amount of radial differential thermal expansion between bottom plate 38/first connecting device 39 and member 51/second end 54 of shell 22. Member 51 is permeable.

The configurations shown in FIGS. 1A and 1B are only representative of two possible configurations for the first variation. Persons skilled in the art will recognize that other workable configurations are possible.

A second variation comprises a cylindrical shell 22 with three or more concentric permeable cylinders (i.e., screens) inside the shell. The annular spaces between the permeable screens are filled with adsorbent 46. The inner screen 30 is flexible in the axial direction and rigid in the radial direction, the outer screen 24 is rigid in both directions, and the intermediate screen(s) is flexible in both directions. All of the screens are interconnected rigidly to the shell at the upper ends of the screens. At the lower ends of the screens, the screens are interconnected rigidly to each other through a bottom plate 38, and the bottom plate is able to move freely in the axial direction. The weight of the screens and the adsorbent is suspended on the rigid outer screen. As thermal pulses move through the adsorbent bed, the screens are alternately heated and cooled. The outer screen expands and contracts axially, and squeezes and releases the adsorbent in the axial direction. The other screens, being flexible in the axial direction, follow the axial movement of the outer screen. The inner and outer screens expand and contract radially, and squeeze and release the adsorbent in the radial direction. The intermediate screen(s) moves radially with the adsorbent since it is flexible in the radial direction, and as a result, it imparts very little additional radial squeezing force on the adsorbent bed.

A third variation comprises a cylindrical shell 22 with three or more concentric permeable cylinders (i.e, screens) inside the shell. The annular spaces between the permeable screens are filled with adsorbent 46. The inner screen 30 is rigid in both the axial and radial directions, the outer screen 24 is flexible in the axial direction and rigid in the radial direction, and the intermediate screen(s) is flexible in both the axial and radial directions. All of the screens are interconnected rigidly to the shell at the upper ends of the screens. At the lower ends of the screens, the screens are interconnected rigidly to each other by a bottom plate 38, and the bottom plate is able to move freely in the axial direction. The weight of the screens and the adsorbent is suspended on the rigid inner screen. As thermal pulses move through the bed, the screens are alternately heated and cooled. The inner screen expands and contracts axially, and squeezes and releases the adsorbent in the axial direction. The other screens, being flexible in the axial direction, follow the axial movement of the inner screen. The inner and outer screens expand and contract radially, and squeeze and release the adsorbent in the radial direction. The intermediate screen(s) moves radially with the adsorbent bed since it is flexible in the radial direction, and as a result, it imparts very little additional radial squeezing force on the adsorbent bed.

A fourth variation comprises a cylindrical shell 22 with four or more concentric permeable cylinders (i.e., screens) inside the shell. The annular spaces between the permeable screens are filled with adsorbent 46. The inner screen 30 and the outer screen 24 are flexible in the axial direction and rigid in the radial direction, one of the intermediate screens is flexible in the radial direction and rigid in the axial direction. The remaining intermediate screen(s) is flexible in both the axial and radial directions. All of the screens are interconnected rigidly to the shell at the upper ends of the screens. At the lower ends of the screens, the screens are interconnected rigidly to each other by a bottom plate 38 and the bottom plate can be moved freely in the axial direction. The weight of the screens, the adsorbent, and the bottom plate is suspended on the intermediate screen that is radially flexible and axially rigid.

The principal configuration and the first variation are preferred to the second, third, and fourth variations. This preference is due to the fact that the axial thermal movement of the screens is much less in the principal configuration and the first variation than in the second, third, and fourth variations. Despite this preference, the designs of the second, third, and fourth variations still provide advantages over the prior art, including the fact that these designs are better able to accommodate multiple layers of adsorbent.

Some additional variations for screen configurations that can accommodate one, two, and three layers of adsorbent are provided in tables 1 through 3, respectively, below. These tables are not exhaustive of all the additional configurations for which screens with bidirectional flexibility provide some benefit to a radial flow adsorption vessel. Similar tables could be generated for configurations that accommodate four, five, six, etc. layers of adsorbent. As a general rule, it is preferred that the inner and outer screens be rigid in the radial direction. If those screens are flexible in the radial direction, the cylindrical shape of the screens may be difficult to maintain during fabrication and may deform progressively with repeated thermal cycling. (This rule may not apply if the radial flexibility of the inner and outer screens is provided by a layer of permeable compressible material.) For this reason, the configurations listed in tables 1 through 3 are considered less important than the principal configuration and variations discussed above.

As discussed above for the principal configuration and variations, and as indicated in tables 1 through 3 below, at least one of the screens is flexible in both the axial and radial directions (i.e., at least one screen has bidirectional flexibility). Preferably, the screen(s) having bidirectional flexibility is an intermediate screen(s).

TABLE 1

Combinations of Screen Flexibility for a Radial Flow Adsorption Vessel with One Layer of Adsorbent
(The table indicates the direction in which the screen is flexible.)

| Inner Screen | Outer Screen |
|---|---|
| axial | both |
| both | axial |
| both | both |
| both | neither* |
| both | radial* |
| neither | both* |
| radial | both* |

*Indicates that the screen assembly must be suspended on the screen that is axially rigid.

TABLE 2

Combinations of Screen Flexibility for a Radial Flow Adsorption Vessel with Two Layers of Adsorbent
(The table indicates the direction in which the screen is flexible.)

| Inner Screen | Intermediate Screen | Outer Screen |
|---|---|---|
| axial | both | both |
| axial | both | radial* |
| axial | raidal | both* |
| both | axial | both |
| both | axial | raidal* |
| both | both | axial |
| both | both | both |
| both | both | neither* |
| both | both | radial* |
| both | neither | both* |
| both | radial | axial* |
| both | radial | both* |
| neither | both | both* |
| radial | axial | both* |
| radial | both | axial* |
| radial | both | both* |

*Indicates that the screen assembly must be suspended on the screen that is axially rigid.

TABLE 3

Combinations of Screen Flexibility for a Radial Flow Adsorption Vessel with Three Layers of Adsorbent
(The table indicates the direction in which the screen is flexible.)

| Inner Screen | Intermediate Screen 1 | Intermediate Screen 2 | Outer Screen |
|---|---|---|---|
| axial | both | axial | both |
| axial | both | axial | radial* |
| axial | both | both | both |
| axial | both | both | radial* |
| axial | both | neither | both* |
| axial | both | radial | both* |
| axial | radial | both | both* |
| axial | radial | axial | both* |
| both | axial | both | axial |
| both | axial | both | both |
| both | axial | both | neither* |
| both | axial | both | radial* |
| both | axial | radial | axial* |
| both | axial | radial | both* |
| both | both | axial | both |
| both | both | axial | radial* |
| both | both | both | axial |
| both | both | both | both |
| both | both | both | neither* |
| both | both | both | radial* |
| both | both | neither | both* |
| both | both | radial | axial* |

TABLE 3-continued

Combinations of Screen Flexibility for a Radial Flow Adsorption Vessel with Three Layers of Adsorbent
(The table indicates the direction in which the screen is flexible.)

| Inner Screen | Intermediate Screen 1 | Intermediate Screen 2 | Outer Screen |
|---|---|---|---|
| both | both | radial | both* |
| both | neither | both | axial* |
| both | neither | both | both* |
| both | radial | axial | both* |
| both | radial | both | axial* |
| both | radial | both | both* |
| neither | both | axial | both* |
| neither | both | both | both* |
| radial | axial | both | axial* |
| radial | axial | both | both* |
| radial | both | axial | both* |
| radial | both | both | axial* |
| radial | both | both | both* |

*Indicates that the screen assembly must be suspended on the screen that is axially rigid.

The ability of the screens to accommodate the large cyclic temperature swings that are associated with a TSA cycle is independent of the manifolding arrangement. This means that the radial flow adsorption vessel of the present invention performs equally well with a Z-flow manifolding arrangement (as shown in FIG. 1), a U-flow arrangement, or a "reverse U-flow arrangement". (See U.S. Pat. No. 5,814,129 with regard to U-flow and reverse U-flow arrangements.)

Furthermore, the screens will perform equally well when the process flow is radially inward or radially outward through the layers of adsorbent, as well as if the vessel is turned upside down.

Although various embodiments of the present invention have been discussed above, it will be appreciated that variations and modifications may be made to those embodiments without departing from the spirit and scope of the invention as defined in the appended claims. Furthermore, although the present invention has been discussed in the context of front end purification systems for cryogenic air separation plants, it will be appreciated and understood that the invention also is applicable to other types of reactions in which a fluid of variable temperature is caused to pass through one or more annular beds of particles of material, including but not limited to active materials such as catalysts.

What is claimed is:

1. A radial flow adsorption vessel comprising a substantially cylindrical shell having a longitudinal axis and a plurality of substantially cylindrical screens, each screen having a different diameter and a longitudinal axis substantially parallel to the longitudinal axis of the shell, the screens disposed concentrically inside the shell, wherein at least one of the screens is flexible in both the axial and radial directions.

2. A radial flow adsorption vessel as in claim 1, wherein the at least one screen flexible in both the axial and radial directions is an intermediate screen disposed between an outer screen and an inner screen.

3. A radial flow adsorption vessel as in claim 2 further comprising a plurality of apertures in the at least one intermediate screen.

4. A radial flow adsorption vessel as in claim 3, wherein the apertures are arranged in a pattern whereby horizontally and vertically oriented beam elements are formed in the at least one intermediate screen.

5. A radial flow adsorption vessel as in claim 4, wherein the beam elements are generally straight.

6. A radial flow adsorption vessel as in claim 4, wherein the beam elements are generally tapered.

7. A radial flow adsorption vessel as in claim 4, wherein the beam elements are generally curved and tapered.

8. A radial flow adsorption vessel as in claim 4, wherein the beam elements are arranged in a herringbone pattern.

9. A radial flow adsorption vessel as in claim 3 further comprising a fine mesh material adapted to prevent the particles of adsorbent from passing through the apertures.

10. A radial flow adsorption vessel as in claim 1, wherein a plurality of particles of adsorbent are disposed in an annular space between at least two adjacent screens.

11. A cryogenic air separation plant having a radial flow adsorption vessel as in claim 1.

12. A radial flow adsorption vessel, comprising:
   a substantially cylindrical shell having a longitudinal axis, a first diameter, a first end, and a second end opposite the first end;
   a bottom plate disposed inside the shell adjacent the second end of the shell and connected rigidly to the shell;
   a substantially cylindrical outer screen disposed inside the shell, the outer screen having a longitudinal axis substantially parallel to the longitudinal axis of the shell, a second diameter less than the first diameter of the shell, an upper end, and a lower end opposite the upper end, wherein the outer screen is flexible in an axial direction and rigid in a radial direction, and the upper end of the outer screen is connected rigidly to the first end of the shell and the lower end of the outer screen is connected rigidly to the bottom plate;
   a substantially cylindrical inner screen disposed inside the outer screen, the inner screen having a longitudinal axis substantially parallel to the longitudinal axis of the shell, a third diameter less than the second diameter of the outer screen, an upper end, and a lower end opposite the upper end, wherein the inner screen is flexible in the axial direction and rigid in the radial direction, and the upper end of the inner screen is connected rigidly to the first end of the shell and the lower end of the inner screen is connected rigidly to the bottom plate; and
   at least one substantially cylindrical intermediate screen disposed between the inner screen and the outer screen, each intermediate screen having a longitudinal axis substantially parallel to the longitudinal axis of the shell, a diameter greater than the third diameter of the inner screen, an upper end, and a lower end, wherein each intermediate screen is flexible both in the axial and radial directions, and the upper end of each intermediate screen is connected rigidly to the first end of the shell and the lower end of each intermediate screen is connected rigidly to the bottom plate.

13. A radial flow adsorption vessel, comprising:
   a substantially cylindrical shell having a longitudinal axis, a first diameter, a first end, and a second end opposite the first end;
   a movable bottom plate disposed inside the shell, the bottom plate having a lower surface facing the second end of the shell;
   a support disposed inside the shell adjacent the second end of the shell and connected rigidly to the shell, the support adapted to supportingly limit axial movement of the movable bottom plate toward the second end of the shell but allow axial movement toward the first end of the shell;
   a substantially cylindrical outer screen disposed inside the shell, the outer screen having a longitudinal axis substantially parallel to the longitudinal axis of the shell, a second diameter less than the first diameter of the shell, an upper end, and a lower end opposite the upper end, wherein the outer screen is flexible in an axial direction and rigid in a radial direction, and the upper end of the outer screen is connected rigidly to the first end of the shell and the lower end of the outer screen is connected rigidly to the bottom plate;
   a substantially cylindrical inner screen disposed inside the outer screen, the inner screen having a longitudinal axis substantially parallel to the longitudinal axis of the shell, a third diameter less than the second diameter of the outer screen, an upper end, and a lower end opposite the upper end, wherein the inner screen is flexible in the axial direction and rigid in the radial direction, and the upper end of the inner screen is connected rigidly to the first end of the shell and the lower end of the inner screen is connected rigidly to the bottom plate; and
   at least one substantially cylindrical intermediate screen disposed between the inner screen and the outer screen, each intermediate screen having a longitudinal axis substantially parallel to the longitudinal axis of the shell, a diameter greater than the third diameter of the inner screen, an upper end, and a lower end, wherein each intermediate screen is flexible both in the axial and radial directions, and the upper end of each intermediate screen is connected rigidly to the first end of the shell and the lower end of each intermediate screen is connected rigidly to the bottom plate.

14. A radial flow adsorption vessel, comprising:
   a substantially cylindrical shell having a longitudinal axis, a first diameter, a first end, and a second end opposite the first end;
   a substantially cylindrical outer screen disposed inside the shell, the outer screen having a longitudinal axis substantially parallel to the longitudinal axis of the shell, a second diameter less than the first diameter of the shell, an upper end, and a lower end opposite the upper end, wherein the outer screen is rigid in an axial direction and rigid in a radial direction, and the upper end of the outer screen is connected rigidly to the first end of the shell and the lower end of the outer screen is connected rigidly to a bottom plate disposed inside the shell adjacent the second end of the shell;
   a substantially cylindrical inner screen disposed inside the outer screen, the inner screen having a longitudinal axis substantially parallel to the longitudinal axis of the shell, a third diameter less than the second diameter of the outer screen, an upper end, and a lower end opposite the upper end, wherein the inner screen is flexible in the axial direction and rigid in the radial direction, and the upper end of the inner screen is connected rigidly to the first end of the shell and the lower end of the inner screen is connected rigidly to the bottom plate; and
   at least one substantially cylindrical intermediate screen disposed between the inner screen and the outer screen, each intermediate screen having a longitudinal axis substantially parallel to the longitudinal axis of the shell, a diameter greater than the third diameter of the inner screen, an upper end, and a lower end, wherein each intermediate screen is flexible both in the axial and radial directions, and the upper end of each intermediate screen is connected rigidly to the first end of the shell and the lower end of each intermediate screen is connected rigidly to the bottom plate.

15. A radial flow adsorption vessel, comprising:

a substantially cylindrical shell having a longitudinal axis, a first diameter, a first end, and a second end opposite the first end;

a substantially cylindrical outer screen disposed inside the shell, the outer screen having a longitudinal axis substantially parallel to the longitudinal axis of the shell, a second diameter less than the first diameter of the shell, an upper end, and a lower end opposite the upper end, wherein the outer screen is flexible in an axial direction and rigid in a radial direction, and the upper end of the outer screen is connected rigidly to the first end of the shell and the lower end of the outer screen is connected rigidly to a bottom plate disposed inside the shell adjacent the second end of the shell;

a substantially cylindrical inner screen disposed inside the outer screen, the inner screen having a longitudinal axis substantially parallel to the longitudinal axis of the shell, a third diameter less than the second diameter of the outer screen, an upper end, and a lower end opposite the upper end, wherein the inner screen is rigid in the axial direction and rigid in the radial direction, and the upper end of the inner screen is connected rigidly to the first end of the shell and the lower end of the inner screen is connected rigidly to the bottom plate; and at least one substantially cylindrical intermediate screen disposed between the inner screen and the outer screen, each intermediate screen having a longitudinal axis substantially parallel to the longitudinal axis of the shell, a diameter greater than the third diameter of the inner screen, an upper end, and a lower end, wherein each intermediate screen is flexible both in the axial and radial directions, and the upper end of each intermediate screen is connected rigidly to the first end of the shell and the lower end of each intermediate screen is connected rigidly to the bottom plate.

16. A radial flow adsorption vessel, comprising:

a substantially cylindrical shell having a longitudinal axis, a first diameter, a first end, and a second end opposite the first end;

a substantially cylindrical outer screen disposed inside the shell, the outer screen having a longitudinal axis substantially parallel to the longitudinal axis of the shell, a second diameter less than the first diameter of the shell, an upper end, and a lower end opposite the upper end, wherein the outer screen is flexible in an axial direction and rigid in a radial direction, and the upper end of the outer screen is connected rigidly to the first end of the shell and the lower end of the outer screen is connected rigidly to a bottom plate disposed inside the shell adjacent the second end of the shell;

a substantially cylindrical inner screen disposed inside the outer screen, the inner screen having a longitudinal axis substantially parallel to the longitudinal axis of the shell, a third diameter less than the second diameter of the outer screen, an upper end, and a lower end opposite the upper end, wherein the inner screen is flexible in the axial direction and rigid in the radial direction, and the upper end of the inner screen is connected rigidly to the first end of the shell and the lower end of the inner screen is connected rigidly to the bottom plate; and a plurality of substantially cylindrical intermediate screens disposed between the inner screen and the outer screen, each intermediate screen having a longitudinal axis substantially parallel to the longitudinal axis of the shell, a diameter greater than the third diameter of the inner screen, an upper end, and a lower end, wherein one intermediate screen is flexible in the radial direction and rigid in the axial direction, and at least one intermediate screen is flexible both in the axial and radial directions, and wherein the upper end of each intermediate screen is connected rigidly to the first end of the shell and the lower end of each intermediate screen is connected rigidly to the bottom plate.

17. A radial flow adsorption vessel, comprising:

a substantially cylindrical shell having a longitudinal axis, a first diameter, a first end, and a second end opposite the first end;

a movable bottom plate disposed inside the shell, the bottom plate having a lower surface facing the second end of the shell;

a support disposed inside the shell adjacent the second end of the shell and connected rigidly to the shell, the support adapted to supportingly limit axial movement of the movable bottom plate;

a substantially cylindrical outer screen disposed inside the shell, the outer screen having a longitudinal axis substantially parallel to the longitudinal axis of the shell, a second diameter less than the first diameter of the shell, an upper end, and a lower end opposite the upper end, wherein the outer screen is flexible in an axial direction and rigid in a radial direction, and the upper end of the outer screen is connected rigidly to the first end of the shell and the lower end of the outer screen is connected rigidly to the bottom plate;

a substantially cylindrical inner screen disposed inside the outer screen, the inner screen having a longitudinal axis substantially parallel to the longitudinal axis of the shell, a third diameter less than the second diameter of the outer screen, an upper end, and a lower end opposite the upper end, wherein the inner screen is flexible in the axial direction and rigid in the radial direction, and the upper end of the inner screen is connected rigidly to the first end of the shell and the lower end of the inner screen is connected rigidly to the bottom plate; and at least one substantially cylindrical intermediate screen disposed between the inner screen and the outer screen, each intermediate screen having a longitudinal axis substantially parallel to the longitudinal axis of the shell, a diameter greater than the third diameter of the inner screen, an upper end, and a lower end, wherein each intermediate screen is flexible both in the axial and radial directions, and the upper end of each intermediate screen is connected rigidly to the first end of the shell and the lower end of each intermediate screen is connected rigidly to the bottom plate.

18. A screen for use in a process having sudden temperature changes or large temperature gradients, comprising a sheet having a pattern of apertures in the sheet, wherein an assemblage of beams in bending is formed in the sheet making the sheet flexible in two perpendicular directions in a plane of the sheet.

19. A screen as in claim 18, wherein the beams are generally straight.

20. A screen as in claim 18, wherein the beams are generally tapered.

21. A screen as in claim 18, wherein the beams are generally curved and tapered.

22. A screen as in claim 18, wherein the beams are arranged in a herringbone pattern.

23. A method for assembling a radial flow adsorption vessel, comprising the steps of:

providing a substantially cylindrical shell having a longitudinal axis;

providing a plurality of substantially cylindrical screens, each screen having a different diameter and a longitudinal axis substantially parallel to the longitudinal axis of the shell, wherein at least one of the screens is flexible in both the axial and radial directions; and installing the screens concentrically inside the shell.

24. A method for assembling a radial flow adsorption vessel as in claim 18 comprising the further step of providing a plurality of particles of adsorbent in an annular space between at least two adjacent screens.

25. A method for manufacturing a containment screen having bidirectional flexibility for use in a radial flow adsorption vessel, comprising the steps of:

providing a substantially rectangular sheet; and forming a pattern of apertures in the sheet, whereby an assemblage of beams in bending is formed in the sheet making the sheet flexible in two perpendicular directions in a plane of the sheet.

26. A method for manufacturing as in claim 25, comprising the further step of forming a cylinder from the sheet having the pattern of apertures.

27. A method for manufacturing as in claim 25, wherein the beams are generally straight.

28. A method for manufacturing as in claim 25, wherein the beams are generally tapered.

29. A method for manufacturing as in claim 25, wherein the beams are generally curved and tapered.

30. A method for manufacturing as in claim 25, wherein the beams are arranged in a herringbone pattern.

* * * * *